US010862827B1

(12) United States Patent
Li et al.

(10) Patent No.: US 10,862,827 B1
(45) Date of Patent: Dec. 8, 2020

(54) NETWORK FORWARDING ELEMENT WITH KEY-VALUE PROCESSING IN THE DATA PLANE

(71) Applicant: Barefoot Networks, Inc., Santa Clara, CA (US)

(72) Inventors: Xiaozhou Li, San Jose, CA (US); Jeongkeun Lee, Mountain View, CA (US); Changhoon Kim, Palo Alto, CA (US); John Nathan Foster, Ithaca, NY (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/372,370

(22) Filed: Apr. 1, 2019

Related U.S. Application Data

(63) Continuation of application No. 15/730,700, filed on Oct. 11, 2017, now Pat. No. 10,305,820.

(Continued)

(51) Int. Cl.
*H04L 12/935* (2013.01)
*H04L 12/741* (2013.01)
*H04L 12/747* (2013.01)

(52) U.S. Cl.
CPC .......... *H04L 49/3009* (2013.01); *H04L 45/54* (2013.01); *H04L 45/742* (2013.01); *H04L 45/745* (2013.01)

(58) Field of Classification Search
None
See application file for complete search history.

(56) References Cited

U.S. PATENT DOCUMENTS 7,184,437 B1 * 2/2007 Cole ................. H04L 45/02
                                                         370/392
9,323,457 B2 * 4/2016 Blott ................. G06F 3/0604
(Continued)

OTHER PUBLICATIONS

Kalia, Anuj, et al., "Using RDMA Efficiently for Key-Value Services," SIGCOMM'14, Aug. 17-22, 2014, 15 pages, ACM, Chicago, IL, USA.

(Continued)

*Primary Examiner* — Hong S Cho
(74) *Attorney, Agent, or Firm* — Compass IP Law PC

(57) ABSTRACT

Some embodiments of the invention provide a forwarding element that has one or more data plane, message-processing pipelines with key-value processing circuits. The forwarding element's data plane key-value circuits allow the forwarding element to perform key-value services that would otherwise have to be performed by data compute nodes connected by the network fabric that includes the forwarding element. In some embodiments, the key-value (KV) services of the forwarding element and other similar forwarding elements supplement the key-value services of a distributed set of key-value servers by caching a subset of the most commonly used key-value pairs in the forwarding elements that connect the set of key-value servers with their client applications. In some embodiments, the key-value circuits of the forwarding element perform the key-value service operations at message-processing line rates at which the forwarding element forwards messages to the data compute nodes and/or to other network forwarding elements.

17 Claims, 8 Drawing Sheets

Related U.S. Application Data

(60) Provisional application No. 62/426,873, filed on Nov. 28, 2016, provisional application No. 62/407,465, filed on Oct. 12, 2016.

(56) References Cited

U.S. PATENT DOCUMENTS

| | | | | |
|---|---|---|---|---|
| 10,185,730 | B2* | 1/2019 | Bestler | G06F 16/2255 |
| 10,257,122 | B1 | 4/2019 | Li et al. | |
| 2007/0050472 | A1* | 3/2007 | Cha | H04L 45/26 709/217 |
| 2012/0136889 | A1* | 5/2012 | Jagannathan | H04L 49/3009 707/769 |
| 2013/0163426 | A1* | 6/2013 | Beliveau | H04L 67/327 370/235 |
| 2014/0348161 | A1* | 11/2014 | Koponen | H04L 41/08 370/389 |

OTHER PUBLICATIONS

Li, Xiaozhou, et al., "Be Fast, Cheap and in Control with SwitchKV," 13th USENIX Symposium on Networked Systems Design and Implementation (NSDI '16), Mar. 16-18, 2016, 15 pages, Santa Clara, CA, USA.

Lim, Hyeontaek, et al., "MICA: A Holistic Approach to Fast In-Memory Key-Value Storage," NSDI'14, 11th USENIX Symposium on Networked Systems Design and Implementation, Apr. 2-4, 2014, 17 pages, USENIX Association, Seattle, WA,USA.

Lim, Hyeontaek, et al., "SILT: A Memory-Efficient, High-Performance Key-Value Store," SOSP'11, 23rd ACM Symposium on Operating Systems Principles, Oct. 23-26, 2011, 13 pages, ACM, Cascais, Portugal.

Lloyd, Wyatt, et al., "Don't settle for Eventual: Scalable Causal Consistency for Wide-Area Storage with COPS," SOSP'11, 23rd ACM Symposium on Operating Systems Principles, Oct. 23-26, 2011, 16 pages, ACM, Cascais, Portugal.

Non-Published commonly owned U.S. Appl. No. 15/730,700, filed Oct. 11, 2017, 40 pages, Barefoot Networks, Inc.

Non-Published commonly Owned U.S. Appl. No. 16/290,899, filed Mar. 2, 2019, 47 pages, Barefoot Networks, Inc.

Phanishayee, Amar, et al., "Flex-KV: Enabling High-performance and Flexible KV Systems," MBDS'12, Proceedings of the 2012 Workshop on Management of Big Data Systems, Sep. 21, 2012, 6 pages, ACM, San Jose, CA, USA.

Vasudevan, Vijay, et al., "Using Vector Interfaces to Deliver Millions of IOPS from a Networked Key-value Storage Server," SOCC'12, 3rd ACM Symposium on Cloud Computing, Oct. 14-17, 2012, 13 pages, ACM, San Jose, CA USA.

* cited by examiner

NETWORK FORWARDING ELEMENT WITH KEY-VALUE PROCESSING IN THE DATA PLANE

CLAIM OF BENEFIT TO PRIOR APPLICATIONS

This application is a continuation application of U.S. patent application Ser. No. 15/730,700, filed Oct. 11, 2017. U.S. patent application Ser. No. 15/730,700 claims the benefit of U.S. Provisional Application 62/426,873, filed Nov. 28, 2016 and U.S. Provisional Application 62/407,465, filed Oct. 12, 2016. U.S. patent application Ser. No. 15/730,700 is incorporated herein by reference.

BACKGROUND

In recent years, many network operations have migrated to data compute servers that execute virtual machines or containers, as these servers have extra computational resources and can handle some amount of network operations. At the same time, however, the processing power of network forwarding elements has dramatically increased and this processing power often remains untapped in many common network deployments. In addition, the packet processing line rates of some of the fastest network forwarding elements are dramatically higher than the computational powers of the data compute servers. Accordingly, it would be beneficial to use the packet processing data plane pipelines of the network forwarding elements to absorb some of the data compute operations from the data compute servers, so that these operations can be performed in the network at dramatically faster rates.

SUMMARY

Some embodiments of the invention provide a network forwarding element (e.g., a switch, a router, etc.) that has one or more data plane, message-processing pipelines with key-value processing circuits. The forwarding element's data plane key-value circuits allow the forwarding element to perform key-value services that would otherwise have to be performed by data compute nodes connected by the network fabric that includes the forwarding element. In some embodiments, the key-value (KV) services of the forwarding element and other similar forwarding elements supplement the key-value services of a distributed set of key-value servers by caching a subset of the most commonly used key-value pairs in the forwarding elements that connect the set of key-value servers with their client applications.

In some embodiments, the key-value circuits of the forwarding element perform the key-value service operations at message-processing line rates at which the forwarding element forwards messages to the data compute nodes and/or to other network forwarding elements in the network fabric. The forwarding element of some embodiments has multiple data ports for receiving and sending data messages in order to forward messages to the data compute nodes and/or to other network forwarding elements in the network fabric. The forwarding element of some embodiments also has one or more message-processing pipelines, each with multiple message-processing stages. In some embodiments, each message processing pipeline is a synchronous pipeline that has its components operate at a minimum clock rate (called line rate above and below).

Each data plane message-processing stage in some embodiments includes message-forwarding circuitry for processing received data messages for forwarding to data compute nodes and/or to other network forwarding elements. The message-forwarding circuitry of a message-processing stage in some embodiments includes a match-action unit (MAU) that has a match sub-unit and an action sub-unit. In some embodiments, the match sub-unit compares one or more fields in a received message's header to identify flow entries in one or more match tables to identify one or more matching flow entries (i.e., entries that match the message's header values), while the action sub-unit performs the action or actions of the identified flow entries. The actions performed by the action units of the MAUs include actions that the forwarding element has to perform on a received data message to forward it to its destination compute node or to other intervening forwarding elements.

The forwarding element of some embodiments includes a parser that extracts a message header from a received data message. As further described below, the extracted header in some embodiments is in a format of a message header vector (HV), which can be modified by successive message processing stages as part of their message processing operations. When the forwarding element finishes processing a data message and is ready to send this data message to its destination compute node or next forwarding element, a deparser of the forwarding element in some embodiments produces the data message header from the HV of the last message processing stage, and combines this header with the data message's payload (which can be a null payload) for transmission.

In some embodiments, each data plane message-processing stage (e.g., each MAU stage) includes key-value circuits that process data messages with key-value instructions and store key-value pairs associated with the key-value instructions. In other embodiments, some but not all of the data plane message-processing stages (e.g., some MAU stages) include key-value circuits for processing key-value instructions and storing key-value pairs associated with the key-value instructions. In some embodiments, the key-value circuits in a data plane message-processing stage (e.g., in an MAU stage) include at least one data plane stateful processing unit (DSPU) for performing one or more stateful operations, such as key-value service operations.

In some embodiments, the DSPU is a programmable processing unit that can perform operations synchronously with the dataflow of the message-processing pipeline (i.e., synchronously at the line rate). As such, the DSPU can process a different HV on every clock cycle, thus ensuring that the DSPU would be able to operate synchronously with the dataflow of the packet processing pipeline. In some embodiments, a DSPU performs every computation with fixed latency (e.g., fixed number of clock cycles).

The received data message's header can include a key-value instruction and a key. It can also include a key-value (e.g., when the key-value instruction is a write instruction). To enable key-value services, the message's header in some embodiments includes (1) a layer 4 port (e.g., UDP source port) value that specifies that the data message contains a key-value instruction and (2) an option field that stores the key-instruction, the key, and optionally a key-value. The key-value instructions in some embodiments include a read instruction, a write instruction, a delete instruction or an insert instruction.

In some embodiments, an MAU stage that performs KV services stores keys in one or more match tables of its match sub-unit, while it stores the values for these keys in a state memory (e.g., in one or more state tables or registers) of that stage's DSPU. For this bifurcated storage of a key-value pair, the match table record for a particular key stores in some embodiments the location in the state memory that contains (i.e., stores) the key value for that particular key.

Some embodiments store a key-value pair in such a bifurcated fashion because inserting a key into a data plane message-processing pipeline is a much slower operation that is performed much less frequently, than modifying the value of a key. Specifically, in some embodiments, keys are stored in the forwarding element less frequently than the rate at which the values of these keys changes. Also, in some embodiments, control plane processes of the forwarding element are used to store (i.e., to insert) a key in the data plane of the forwarding element. Control plane operations are slower than data plane operations. Given that key insertion operations are less frequent than changes to key values, some embodiments store the keys in match tables that require the slower control-plane processes, while saving the more limited state memory resources (which can be updated at data plane line rates by the DSPUs) for the key values that are updated more frequently.

In addition to the location in the state memory that stores the value associated with a key stored in the received data message's header along with a key-value instruction, the DSPU of a processing stage also receives the key-value instruction, or receives one or more parameters from which it can identify the key-value instruction. When the received data message's header contains a key value, the DSPU in some embodiments also receives the key value. In some embodiments, the DSPU gets the key value only when the key-value instruction is a write instruction, while in other embodiments, the DSPU gets the key value even when the key-value instruction is not a write instruction.

When the key-value instruction is a write instruction, the DSPU in some embodiments writes the key value that it receives into the state memory at the location specified by the matching record in the match table. In other embodiments, the DSPU invalidates the value stored in the state memory when it receives a write instruction from a key-value client, so that the write instruction can be sent to a key-value server and this value changed in the record of this server, before this new value is stored in the forwarding element. These embodiments perform this operation to ensure that the forwarding elements never cache (i.e., never store) key values that are not consistent with the values stored on the back end key-value servers.

After a key-value server updates a key value (i.e., writes a new key value) in its storage, the server sends a data message with a key-value write instruction in its header with the updated value, and the forwarding element's DSPU writes this updated value into its state memory record (e.g., the record that it previously invalidated). In some embodiments, the key-value server uses a different write/update instruction than the write/update instruction used by the key-value clients, and this different write/update instruction directs the DSPU (or the DSPU's associated match sub-units that instructs the DSPU to direct the DSPU) to update the key value instead of just invalidating the key value. In other embodiments, the key-value server sends the same type of write/update instruction as the key-value clients but the DSPU's associated match sub-unit matches the received instruction along with the received message's source identifier(s) (e.g., source IP address) with the records in the match table, in order to generate a different action instruction (i.e., a write instruction instead of an invalidate instruction) to the DSPU with respect to the key value record that the match sub-unit identifies for the DSPU.

When the key-value instruction is a read instruction, the DSPU reads the key value that is stored in the state memory at the location specified by the matching record in the match table, and supplies this read value to the action sub-unit of its MAU. Even during the write operation, the DSPU in some embodiments outputs to the action sub-unit the key value that it writes into the state memory, and the action sub-unit ignores this value. For a read operation, the action sub-unit updates the key value field in the HV of the received data message to include the key value that the DSPU read from the state memory.

The size of the key values that the forwarding element stores can be augmented by using multiple state memories of multiple processing stages to store different portions of the key value. To facilitate such read and write operations, the control plane of the forwarding element configures the circuits (e.g., the data extractors, the DSPUs, and/or the action sub-units, etc.) of different processing stages to read from and/or to write to different portions of the HV (e.g., different portions of the layer 4 option field mentioned above). In some embodiments, the forwarding element can be configured to further augment the size of the key value by allowing the received data message's processed HV to recirculate through the message processing pipeline(s) one or more times. For each iteration, the control plane of the forwarding element configures the circuits (e.g., the data extractors, the DSPUs, and/or the action sub-units, etc.) of each KV-processing stage to read from and/or to write to different portions of the HV (e.g., different portions of the layer 4 option field mentioned above). In some embodiments, each DSPU is responsible for maintaining its own portion or portions of key value in its own state memory.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide network forwarding elements (e.g., switches, routers, etc.) that have data plane, message-processing pipelines with key-value processing circuits. A forwarding element's data plane key-value circuits allow the forwarding element to perform key-value services that would otherwise have to be performed by data compute nodes (e.g., key-value servers) connected by the network fabric that includes the forwarding element. In some embodiments, the key-value (KV) services of the forwarding elements of some embodiments supplement the key-value services of a distributed set of key-value servers by caching a subset of the most commonly used key-value pairs in the forwarding elements that connect the set of key-value servers with their client applications or devices (referred to above and below as "key-value clients").

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
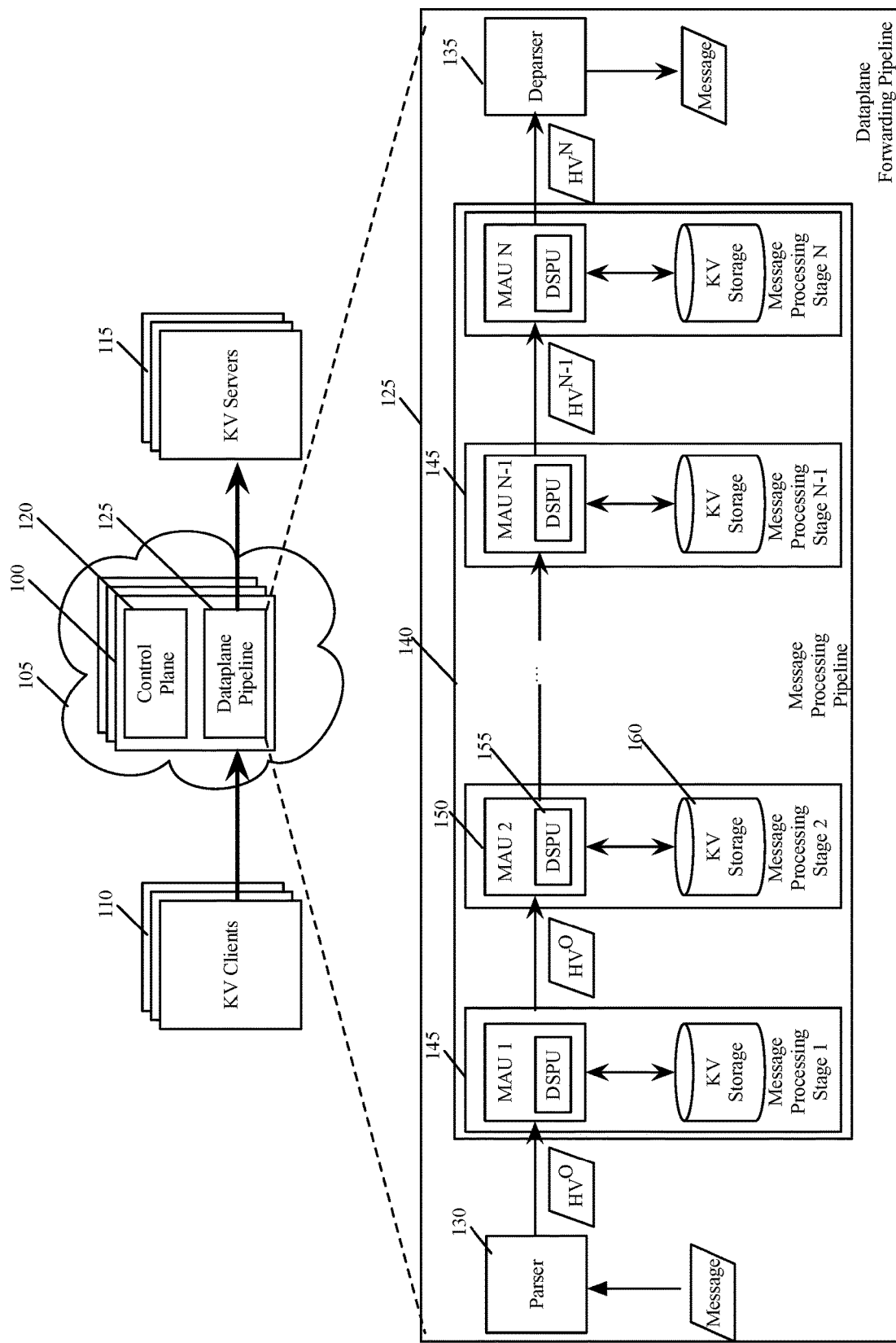
FIG. 1 illustrates examples of forwarding elements of some embodiments.

FIG. 1 illustrates examples of the KV-processing forwarding elements 100 of some embodiments of the invention. As shown, each forwarding element 100 is part of the network fabric 105 that connects several KV service clients 110 (e.g., virtual machines, containers, etc.) to several KV service servers 115 (e.g., virtual machines, containers, etc.). The KV servers 115 store key values for a large number of keys that the KV service clients 110 need to access. Multiple KV servers 115 are used in order to distribute the load on the individual servers. In some embodiments, the KV servers 115 implement a distributed key-value processing application.

To provide faster access to some of the more commonly used key-value pairs, the forwarding elements 100 cache these key-value pairs. Also, by caching the most commonly used key-value pairs, these forwarding elements eliminate the need for querying the backend servers 115 for these keys and dramatically improve the load on these servers. In some embodiments, the key-value circuits of a forwarding element 100 perform the key-value service operations at message-processing line rates at which the forwarding element forwards messages to the data compute nodes and/or to other network forwarding elements in the network fabric. The forwarding element of some embodiments has multiple data ports (not shown) for receiving and sending data messages in order to forward messages to the data compute nodes and/or to other network forwarding elements in the network fabric.

As shown in FIG. 1, each forwarding element 100 also has a control plane 120 and a data plane 125. The data plane 125 includes forwarding circuits (e.g., switching circuits, routing circuits, etc.) for processing and forwarding messages received at the ports of the forwarding element. The control plane 120 configures the forwarding circuits of the data plane. In some embodiments, the control plane 120 is implemented by a control software layer that is executed by one or more general purpose processors (e.g., CPUs) of the forwarding element, while the data plane 125 is implemented by forwarding circuits that are custom built (e.g., the data plane 125 is implemented by an application specific integrated circuit, ASIC) for performing forwarding operations at very fast line rates.

As shown, the forwarding element 100 of some embodiments includes a parser 130, a deparser 135, and a multi-stage message-processing pipeline 140. In some embodiments, the forwarding element has multiple message-processing pipelines, each with their own parsers and deparsers. Also, in some embodiments, the message processing pipelines include ingress processing pipelines and egress processing pipelines that are respectively before and after a traffic management stage (not shown) of the forwarding element, with this traffic management stage performing a crossbar switching operation to forward messages between the ingress and egress pipelines.

The parser 130 extracts a message header from a received data message. In some embodiments, the extracted header is in a format of a header vector (HV), which can be modified by successive message processing stages of the message-processing pipeline. In some embodiments, the parser includes modules such as a header identification module, a TCAM module and a field extraction module for identifying various fields of the message header and extracting the corresponding field data to create the HV.

The deparser 135 produces the data message header from the HV of the last message processing stage, and reconstitutes the data message (e.g., combines the header with a payload) when the forwarding element finishes processing the data message and is ready to send this data message to its destination compute node (e.g., to the destination key-value server) or next forwarding element. In some embodiments, the parser sends a message's payload or the entire message along a bypass path to the deparser, which then combines this payload or the entire message with the header vector output by the last message-processing stage 145 of the pipeline 140.

The message-processing pipeline 140 has multiple message-processing stages 145. In some embodiments, this pipeline is a synchronous pipeline that has its components operate at a minimum clock rate (e.g., at the line rate). Each message-processing stage in some embodiments includes message-forwarding circuitry for processing received data messages for forwarding to data compute nodes and/or to other network forwarding elements.

The message-forwarding circuitry of a message-processing stage 145 in some embodiments includes a match-action unit (MAU) 150 that has a match sub-unit with match tables and an action sub-unit with an action engine. In some embodiments, the match sub-unit compares one or more fields in a received message's header to identify flow entries in one or more match tables to identify one or more matching flow entries (i.e., entries that match the message's header values), while the action sub-unit (e.g., the action engine) performs the action or actions of the identified flow entries. The actions performed by the action units of the MAUs include actions that the forwarding element has to perform on a received data message to forward it to its destination compute node or to other intervening forwarding elements. To effectuate these forwarding actions, the action sub-unit (e.g., the action engine) often has to modify the header vectors of the data messages being processed by the data plane 125. Examples of the match and action sub-units will be further described below by reference to FIG. 3.

This same message-processing architecture (e.g., the same match tables and action engines) are configured to perform not only message-forwarding operations, but also key-value service operations. For instance, in some embodiments, each message-processing stage 145 also includes key-value circuits and storages that process data messages with key-value instructions and store key-value pairs associated with the key-value instructions. In other embodiments, some but not all of the message-processing stages 145 include key-value circuits and storages. The KV storage 160 in each message-processing stage 145 is a single storage that stores both the keys and their values in some embodiments. In other embodiments, the KV storage 160 in each message-processing stage 145 is a bifurcated storage that stores the keys in one data store (e.g., in a set of one or more match tables of the MAU), while storing the values for these keys in another data store (e.g., in a set of one or more registers or tables of a state memory). This bifurcated storage will be further described below.

In some embodiments, the key-value circuits in a message-processing stage 145 include at least one data plane stateful processing unit (DSPU) 155 for performing one or more stateful operations, such as key-value service operations. In some embodiments, a DSPU 155 is a programmable processing unit that can perform operations synchronously with the dataflow of the message-processing pipeline (i.e., synchronously at the line rate). As such, the DSPU can process a different HV on every clock cycle, thus ensuring that the DSPU would be able to operate synchronously with the dataflow of the message-processing pipeline. In some embodiments, a DSPU performs every computation with fixed latency (e.g., fixed number of clock cycles). In some embodiments, a DSPU include ALUs (arithmetic logic units) and comparators that are used to predicate on or off the ALUs. This predication allows conditional computation statement such as "X=cond ? A: B" to be executed quickly in the data-plane with little hardware cost. This mechanism is used to conditionally update state variables.

Figure 2:
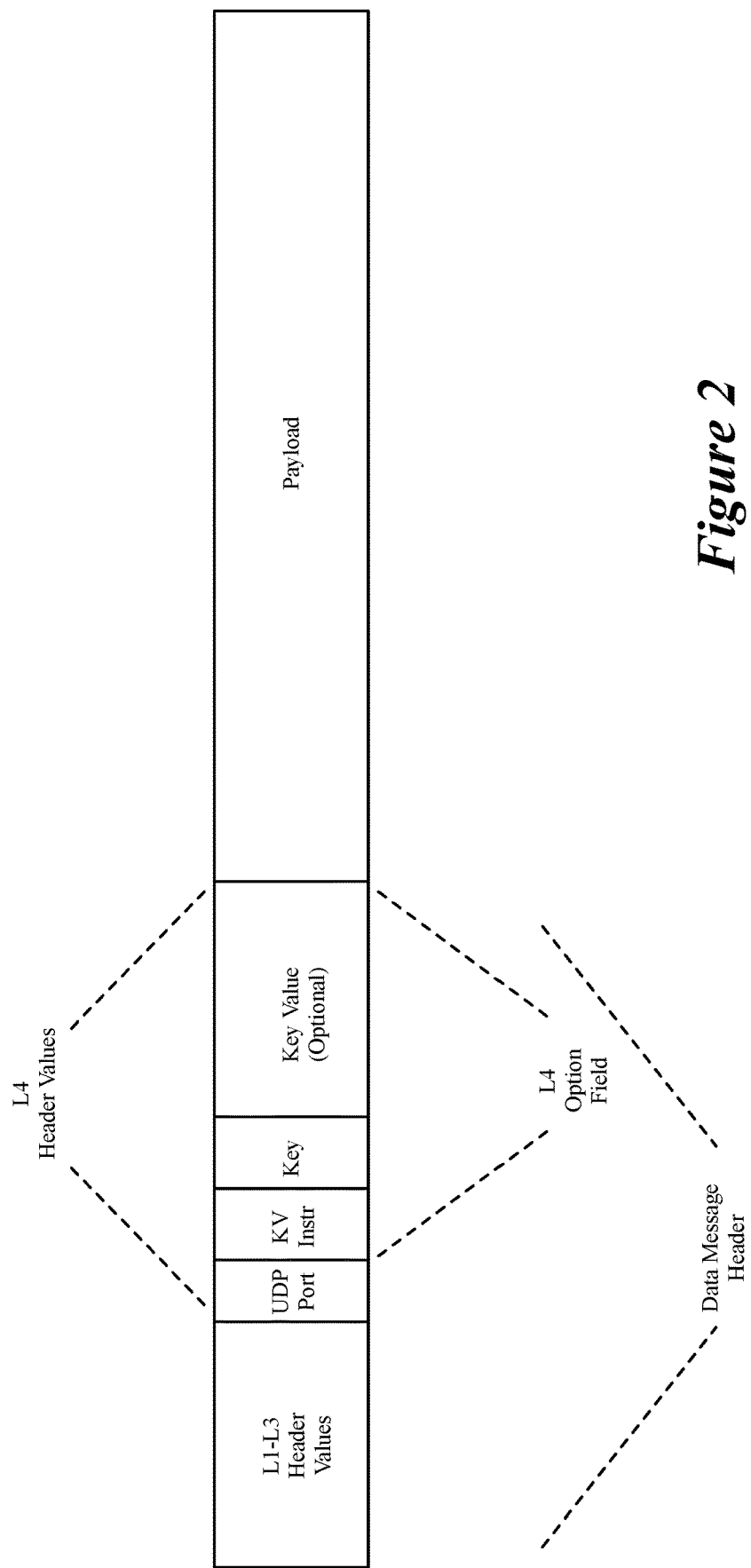
FIG. 2 illustrates a data message with a header for a key value instruction of some embodiments.

As mentioned above, the parser 130 in some embodiments extracts the message header from a received data message to produce a HV that can be modified by successive message processing stages 145 as part of their message processing operations. When a data message relates to key-value services, the message's header in some embodiments includes a key-value instruction, a key, and in some cases a key-value (e.g., when the key-value instruction is a write instruction). To identify that the data message pertains to key-value services, the header in some embodiments includes (1) a layer 4 port (e.g., UDP source port) value that specifies that the data message contains a key-value instruction, and (2) an option field that stores the key-instruction, the key, and optionally a key-value, as shown in FIG. 2. This figure also shows the data message having a payload and L1-L3 header values. In some embodiments, a data message with KV instructions can have an empty payload or null payload.

The key-value instruction in some embodiments can be (1) a read instruction that requests the key-value service (provided by the key-value servers and the forwarding elements) to provide a value for a particular key, (2) a write instruction that directs the key-value service to modify a value for a particular key, (3) a delete instruction that directs the forwarding element to delete a particular key-value pair that the forwarding element stores, and (4) an insert instruction that directs the forwarding element to store a particular key-value pair.

In some embodiments, the MAU stage that performs KV services stores keys in one or more match tables of its match sub-unit, while it stores the values for these keys in a state memory (e.g., in one or more state tables or registers) of that stage's DSPU. For this bifurcated storage of a key-value pair, the match table record for a particular key stores in some embodiments the location in the state memory that contains (i.e., stores) the key value for that particular key.

Some embodiments store a key-value pair in such a bifurcated fashion because inserting a key into the data plane message processing pipeline is a much slower operation that is performed much less frequently, than modifying the value of a key. Specifically, in some embodiments, keys are stored in the forwarding element less frequently than the rate at which the values of these keys changes. Also, in some embodiments, control plane processes of the forwarding element are used to store (i.e., to insert) a key in the data plane of the forwarding element. Control plane operations are slower than data plane operations. Given that key insertion operations are less frequent than changes to key values, some embodiments store the keys in match tables that require the slower control-plane processes, while saving the more limited state memory resources (which can be updated at data plane line rates by the DSPUs) for the key values that are updated more frequently.

In addition to the location in the state memory that stores the value associated with a key stored in the received data message's header along with a key-value instruction, the DSPU 155 of a processing stage 145 also receives the key-value instruction, or receives one or more parameters from which it can identify the key-value instruction. When the received data message's header contains a key value, the DSPU in some embodiments also receives the key value. In some embodiments, the DSPU gets the key value only when the key-value instruction is a write instruction, while in other embodiments, the DSPU gets the key value even when the key-value instruction is not a write instruction.

When the key-value instruction is a write instruction, the DSPU in some embodiments writes the key value that it receives into the state memory at the location specified by the matching record in the match table. In other embodiments, the DSPU invalidates the value stored in the state memory when it receives a write instruction from a key-value client, so that the write instruction can be sent to a key-value server and this value changed in the record of this server, before this new value is stored in the forwarding element. These embodiments perform this operation to ensure that the forwarding elements never cache key values that are not consistent with the values stored on the backend key-value servers.

After a key-value server updates a key value (i.e., writes a new key value) in its storage, the server sends a data message with a key-value write instruction and the new key value in its header with the updated value, and the forwarding element's DSPU writes this updated value into its state memory record (e.g., the record that it previously invalidated). In some embodiments, the key-value server uses a different write/update instruction than the write/update instruction used by the key-value clients, and this different write/update instruction directs the DSPU (or the DSPU's associated match sub-units that instructs the DSPU to direct the DSPU) to update the key value in the state memory instead of just invalidating the key value in this memory. In other embodiments, the key-value server sends the same type of write/update instruction as the key-value clients but the DSPU's associated match sub-unit matches the write/update instruction and the received message's source identifier(s) (e.g., source IP address) with the record identifiers in the match table, in order to generate a different action instruction (i.e., a write instruction instead of an invalidate instruction) for the DSPU with respect to the key value record that the match sub-unit identifies for the DSPU.

When the key-value instruction is a read instruction, the DSPU reads the key value that is stored in the state memory at the location specified by the matching record in the match table, and supplies this read value to the action sub-unit of its MAU. Even during the write operation, the DSPU in some embodiments outputs to the action sub-unit the key value that it writes into the state memory, but the action sub-unit ignores this value. For a read operation, the action sub-unit updates the key value field in the HV of the received data message to include the key value that the DSPU read from the state memory. Also, for a read operation, one or more of the message processing stages change the destination network address of the message to return the read value to the source machine that sent the key-value read instruction.

The size of the key values that the forwarding element stores can be augmented by using multiple state memories of multiple processing stages to store different portions of the key value. To facilitate such read and write operations, the control plane of the forwarding element configures the circuits (e.g., the data extractors, the DSPUs, and/or the action sub-units, etc.) of different processing stages to read from and/or to write to different portions of the HV (e.g., different portions of the layer 4 option field mentioned above). In some embodiments, the forwarding element can be configured to further augment the size of the key value by allowing the received data message's processed HV to recirculate through the message processing pipeline(s) one or more times. For each iteration, the control plane of the forwarding element configures the circuits (e.g., the data extractors, the DSPUs, and/or the action sub-units, etc.) of each KV-processing stage to read from and/or to write to different portions of the HV (e.g., different portions of the layer 4 option field mentioned above). In some embodiments, each DSPU is responsible for maintaining its own portion or portions of key value in its own state memory.

Figure 3:
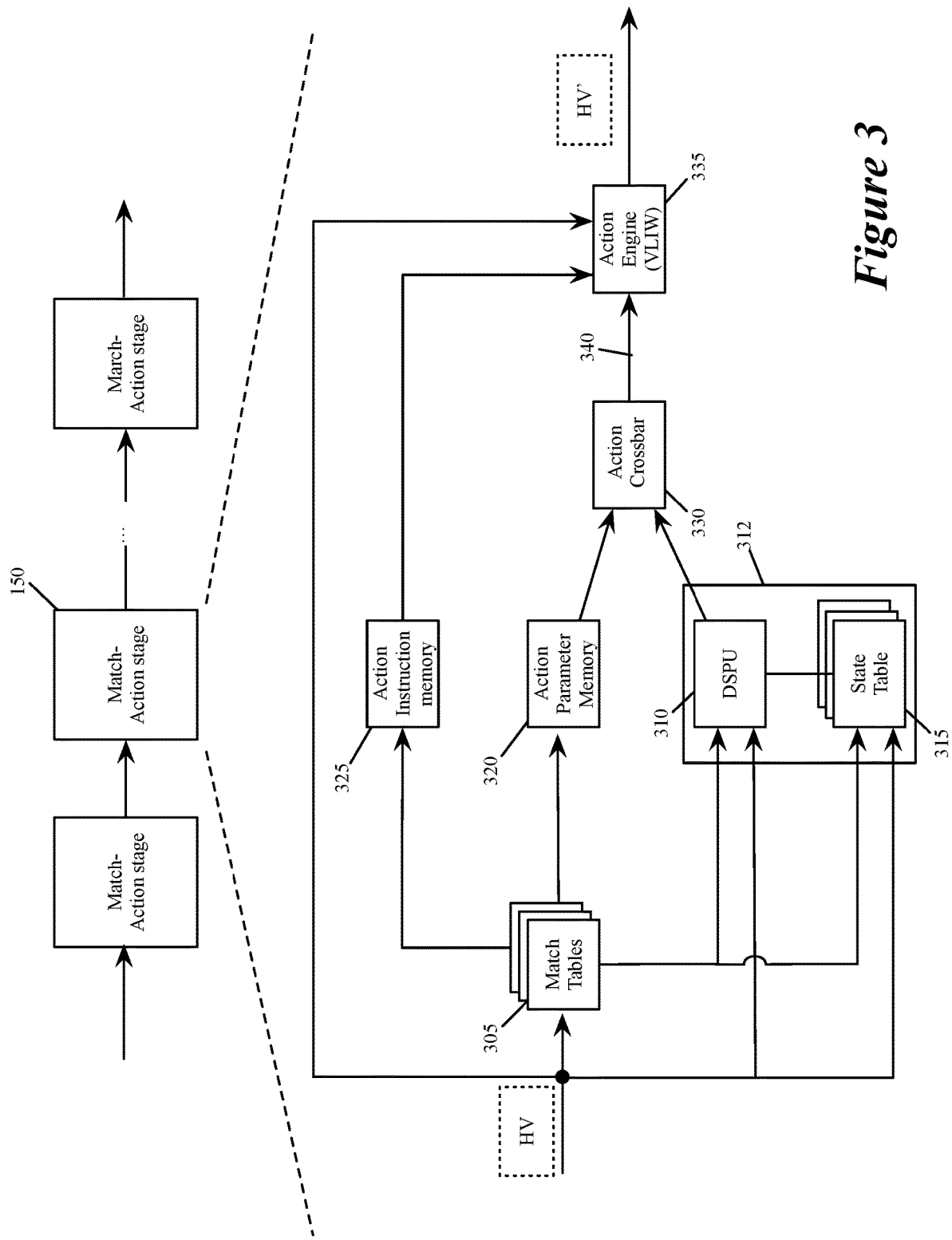
FIG. 3 illustrates an example of a match action unit of some embodiments.

In a message processing pipeline 140, each message-processing stage including message-processing circuitry for processing received data messages by performing one or more operations based on header vectors associated with the data messages. FIG. 3 illustrates an example of a match-action unit 150 of some embodiments. A match-action unit (MAU) is one example of the message processing stage of a message processing pipeline of some embodiments. Each MAU in some embodiments can perform message forwarding operations on received data messages and/or performing stateful operations based on these data messages. Each MAU performs these operations by processing values stored in the header vectors of the data messages, as received from the message parser 130 or from a previous MAU 150 in its message processing pipeline.

As shown in FIG. 3, the MAU 150 in some embodiments has a set of one or more match tables 305, a data plane stateful processing unit 310 (DSPU), a set of one or more stateful tables 315, an action crossbar 330, an action parameter memory 320, an action instruction memory 325, and an action engine 335. The match table set 305 can compare one or more fields in a received message's header vector (HV) to identify one or more matching flow entries (i.e., entries that match the message's HV). The match table set can be TCAM tables or exact match tables in some embodiments. In some embodiments, the match table set can be accessed at an address that is a value extracted from one or more fields of the message's header vector, or it can be a hash of this extracted value.

In some embodiments, the value stored in a match table record that matches a message's flow identifier, or that is accessed at a hash-generated address, provides addresses for the action parameter memory 320 and action instruction memory 325. Also, such a value from the match table can provide an address and/or parameter for one or more records in the stateful table set 315, and can provide an instruction and/or parameter for the DSPU 310. As shown, the DSPU 310 and the stateful table set 315 also receive a processed message's header vector. The header vectors can include instructions and/or parameters for the DSPU, while containing addresses and/or parameters for the stateful table set 315.

The DSPU 310 and the stateful table set 315 form the MAU's stateful sub-unit 312, which performs stateful operations, such as KV service operations. The DSPU 310 in some embodiments performs one or more stateful operations, while a stateful table 315 stores state data used and generated by the DSPU 310. For example, as mentioned above, some embodiments store the key values in state tables, while storing in the match table 305 the keys and the location in the state tables that contain the keys' associated values.

In some embodiments, the DSPU includes one or more programmable arithmetic logic units (ALU) that perform operations synchronously with the dataflow of the message-processing pipeline (i.e., synchronously at the line rate). As such, the DSPU can process a different header vector on every clock cycle, thus ensuring that the DSPU would be able to operate synchronously with the dataflow of the message-processing pipeline. In some embodiments, a DSPU performs every computation with fixed latency (e.g., fixed number of clock cycles). Examples of such operations in some embodiments include reading and writing key values, as further described above and below.

The DSPU 310 output a set of action parameters to the action crossbar 330. The action parameter memory 320 also outputs a set of action parameters to this crossbar 330. The action parameter memory 320 retrieves the action parameter that it outputs from its record that is identified by the address provided by the match table set 305. The action crossbar 330 in some embodiments maps the action parameters received from the DSPU 310 and action parameter memory 320 to an action parameter bus 340 of the action engine 335. This bus provides the set of action parameters to this engine 335. For different data messages, the action crossbar 330 can map the action parameters from DSPU 310 and memory 320 differently to this bus 340. The crossbar can supply the action parameters from either of these sources in their entirety to this bus 340, or it can concurrently select different portions of these parameters for this bus in some embodiments.

The action engine 335 also receives a set of instructions to execute from the action instruction memory 325. This memory 325 retrieves the instruction set from its record that is identified by the address provided by the match table set 305. The action engine 335 also receives the header vector for each message that the MAU processes. Such a header vector can also contain a portion or the entirety of a set of instructions to process and/or a set of parameters for processing the instruction. In some embodiments, a data-plane configurator (not shown) supplies flow entries (e.g., the ACL flow-match identifiers and/or action identifiers) in one or more MAU tables (e.g., at the direction of the control plane 120).

The action engine 335 in some embodiments includes a parameter multiplexer and a very large instruction word (VLIW) processor. In some embodiments, the VLIW processor is a set of one or more ALUs. In some embodiments, the parameter multiplexer receives the parameter sets from the action crossbar 330 and input header vector and outputs the parameters as operands to the VLIW processor according to the instruction set (from the instruction memory 335 or the header vector). The VLIW processor executes instructions (from the instruction memory 335 or the header vector) applied to the operands received from the parameter multiplexer. The action engine 335 stores the output of its operation in the header vector in order to effectuate a message forwarding operation and/or KV service operation of its MAU stage 150 (e.g., to insert a key value in the PHV). The output of the action engine 335 forms a modified header vector (HV') for the next MAU stage.

In other embodiments, the match tables 305 and the action tables 315, 320 and 325 of the MAU stage 150 can be accessed through other methods as well. For instance, in some embodiments, each action table 315, 320 or 325 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 305. As in the case of a match table 305, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 305 for a message's header vector. As mentioned above, the match table records are identified through direct addressing or record matching operations in some embodiments. The independent address scheme is similar to the direct addressing scheme except that it does not use the same address that is used to access the match table set 305. Like the direct addressing scheme, the table address in the independent addressing scheme can either be the value extracted from one or more fields of the message's header vector, or it can be a hash of this extracted value. In some embodiments, not all the action tables 315, 320 and 325 can be accessed through these three addressing schemes, e.g., the action instruction memory 325 in some embodiments is accessed through only the direct and indirect addressing schemes.

In some embodiments, the MAU 150 includes other components that are not shown in FIG. 3. For example, in some embodiments, the MAU 150 includes an extraction crossbar that receives incoming HV and extracts various data fields for the match table 305 and the state table 315. The MAU also includes a hash generator, which receives extracted data fields from the extraction crossbar and produces a hash value that provides an address of a record in one or more tables (e.g., the match table 305).

When an MAU 150 performs key-value operations, its components perform several operations. For example, when the KV instruction is a write operation, the match table 305 outputs an instruction for the DSPU to write to a particular location in the stateful tables, the DSPU writes a value (e.g., extracted from the message's header vector) into this location. On the other hand, when the KV instruction is a read operation, the match table 305 outputs an instruction for the DSPU 310 to read a particular location in the stateful tables, the DSPU reads this location, and then provides this read value to the action engine 335 to write into the HV, in some embodiments.

More specifically, in some embodiments, a record in a match table that is associated with a key value operation includes a match identifier and an action identifier. For key-value service operations, the match table 305 in some embodiments retrieves the match identifier of the record (e.g., at a location specified by the hash value address generated by the MAU's hash address generator). This match identifier is a key when the match sub-unit performs KV service operations. The match table then determines whether the retrieved key matches the key extracted from the header vector by the MAU's extraction crossbar. If so, the action identifier of the retrieved record provides the location in the state memory 315 that stores the value for the retrieved record's key.

In order to specify a match between a HV key (i.e., a key stored in the received data message) and a match table key (i.e., a key stored in the match table 305), a match table in the message processing pipeline 140 has to also match a layer 4 port of the received data message (e.g., the UDP source port of the received data message) to one of its records that stores the layer 4-port value that identifies the received data message (i.e., identified the processed HV) as one that contains a KV instruction. Different embodiments perform this operation differently. In some embodiments, this port matching operation is performed by an earlier MAU stage (than the MAU stage that tries to match the HV key with ones of its stored keys), which updates the HV to indicate that the HV includes a KV instruction when the received data message's HV has the layer 4 port designation that identifies this message as one that contains a KV instruction.

In other embodiments, this port matching operation is performed by the same MAU stage that tries to match the HV key with one of the keys that it stores. For instance, the match table has at least two tables, a first table that stores the layer 4-port record, and a second table that stores the keys. In these embodiments, the first table is a predication table for the second table, in that the first table must identify a matching record (i.e., must specify the matching of the HV's layer 4 port to the KV port stored in the first table), in order for the second table to be able to identify a matching key record even when such a record exists.

When the match table determines that the HV key matches one of the keys that it stores, the match table provides to the DSPU 310 the location in the state memory 315 that stores the value for the matching key. From the MAU's extraction crossbar, the DSPU 310 receives a set of HV parameters from which the DSPU ascertains the type of KV operation (e.g., read, write, delete, etc.) that it has to perform. In some embodiments, the match table output to the DSPU is in form of a conditional instruction (e.g., in form of a series of conditional IF-THEN-ELSE operations) that the DSPU resolves based on the instruction parameters that it receives from the MAU's extraction crossbar. In some embodiments, the DSPU also receives a key value from the extraction crossbar when the HV contains a key value (e.g., for a KV write instruction).

For certain KV instructions (e.g., read instructions), the DSPU produces a DSPU action parameter for the action engine 335. The action parameter can include state information stored in the state memory 315 (e.g., can include a key value that the action engine 335 has to write into the HV). The DSPU provides its DSPU action parameter to the action crossbar 330, which also receives the action parameter from the action parameter memory 320 based on the match output of the match table 305.

When the MAU 305 is not performing a KV operation or other stateful operations, the crossbar 330 in some embodiments can be configured to output action parameter from the action parameter memory 320 based on the match table output. On the other hand, the action crossbar 330 outputs the DSPU action parameter to the action engine 335 when the MAU is performing a KV operation. In other embodiments, the action crossbar 330 is configured to concurrently select different portions or fields of different action parameters from the action parameter memory 320 and/or the DSPU output, as mentioned above.

Figure 4:
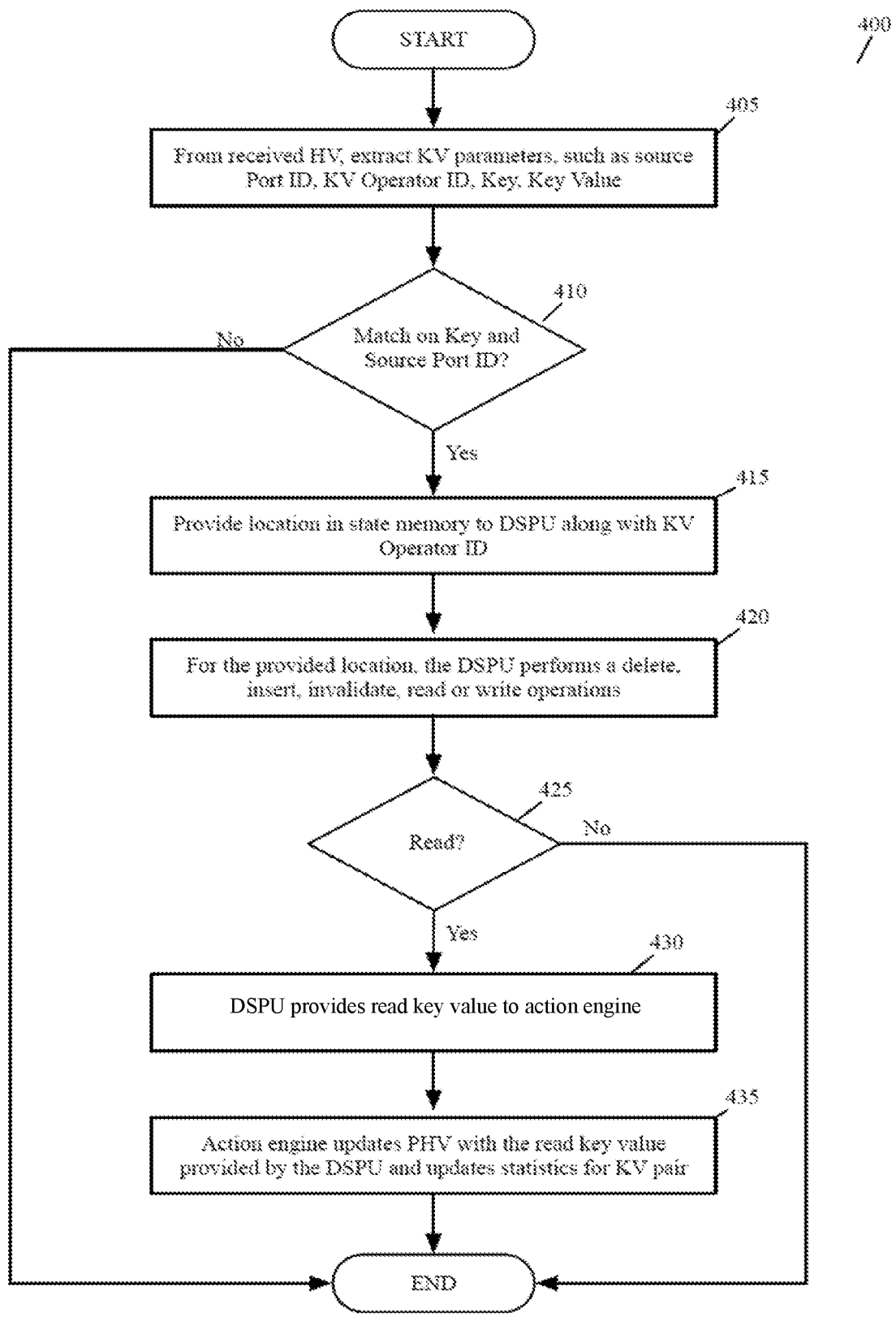
FIG. 4 conceptually illustrates a process that a MAU performs in some embodiments to process a message header vector with a key value (KV) instruction.

FIG. 4 conceptually illustrates a process 400 that a MAU 150 performs in some embodiments to process a HV with a KV instruction. As shown, the extraction crossbar initially (at 405) receives a HV from the parser or a previous stage MAU, and extracts various data fields for various components of the MAU, e.g., the match table 305, the DSPU 310, the state table 315, and the action engine 335 in some embodiments. For a KV operation, the extracted fields include in some embodiments the source port identifier, KV instruction, key, and optionally a key-value.

Next, at 410, the match table 305 determines whether the received data message has a source port identifier that matches the a KV-operation identifier that the match table stores, and if so, whether one of the keys stored in the match table matches the key extracted from the HV by the extraction crossbar. If not, the KV process 400 ends.

On the other hand, when the received data message contains the source port identifier for a KV operation and the match table matches the extracted key with one of its stored keys, the match table 305 extracts (at 415) from the action identifier of the matching record the location in the state memory 315 that stores the value for the retrieved record's key. The match table 305 provides (at 415) to the DSPU 310 this location in the state memory 315 that stores the value for the matching key. From the extraction crossbar, the DSPU 310 also receives (at 415) a set of HV parameters from which the DSPU ascertains the type of KV operation (e.g., read, write, delete, etc.) that it has to perform, and a key value when the HV contains the key value (e.g., for a KV write instruction).

At 420, the DSPU performs a KV operation with respect to the key value stored in the state memory 315 at the location provided at 415. This operation can be read operation, write operation, delete operation, insert operation or invalidate operation, each of which was described above. When the operation is delete, the record in the match table that stores the key is also deleted. This is done in some embodiments through the control plane 120. In some embodiments, the data plane notifies the control plane 120 that it needs to delete the key's record in the match table.

At 425, the DSPU determines whether the KV operation is a read operation. If not, the process ends. Even when the operation is not a read operation, the DSPU outputs in some embodiments the content of the key value record to the action engine 330. In some embodiments, the action engine 330 ignores this value. In some embodiments, the action engine 330 or the DSPU 310 updates statistics (e.g., increments counts) that it maintains for all operations or different operations performed with respect to the key value record accessed at 420.

Otherwise, the DSPU provides (at 430) the read key value (i.e., the key value retrieved from the state memory 315), to the action engine 335 via the action crossbar 330. At 435, the action engine 335 then updates the HV with the key value provided by the DSPU based on the write instruction received from the action instruction memory 325, and updates statistics for the processed key that the action engine maintains in a statistics table (not shown). In other embodiments, the DSPU updates these statistics, or another DSPU of another MAU stage updates these statistics, in its stateful table. Also, when the key value instruction specifies a key-value read operation, the action engine or another module (e.g., another action engine) of another MAU stage in some embodiments modifies the network destination address of the data message in order to return the data message with the read key value to the source machine that originally sent the key value read instruction in the data message. In some embodiments, the read key-value is sent to another machine than the source machine that sent the key value read instruction, and the destination address of the data message is changed to the address of this other machine. After 435, the process ends.

Figure 5:
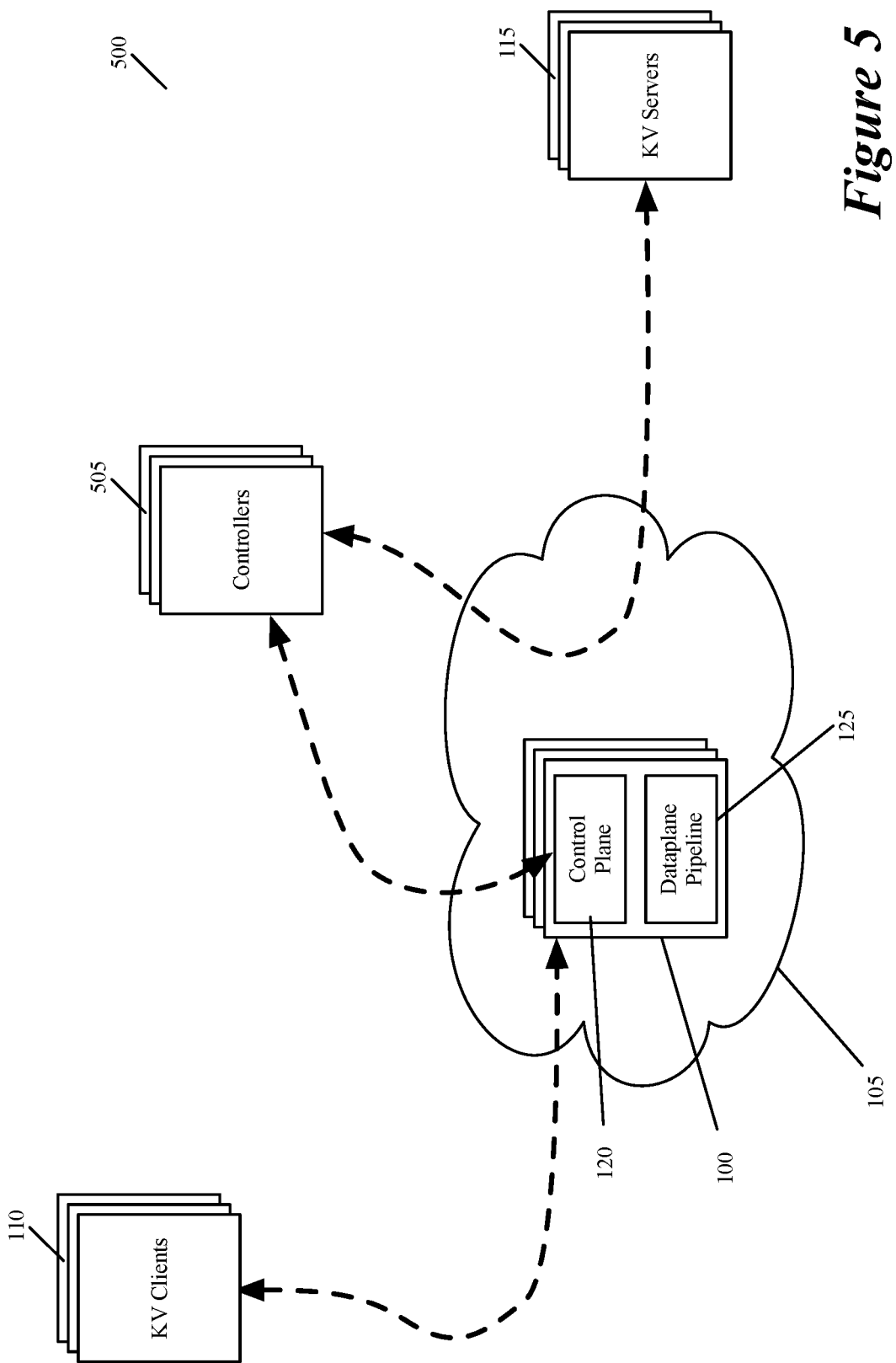
FIG. 5 illustrates a KV system that includes the KV servers, KV-processing forwarding elements, and one or more KV controllers.

FIG. 5 illustrates a KV system 500 that includes the KV clients 110, KV servers 115, KV-processing forwarding elements 100, and one or more controllers 505. The controller set collect statistics from the KV servers 115 regarding the number of times that KV clients 110 accessed the KV servers for different key-value pairs. In some embodiments, each time a KV server performs a read or write operation for a key, the KV server updates statistics that it maintains for the key.

The controller set also collects statistics from the KV-processing forwarding elements 100 regarding the number of times that the forwarding elements performed operations (e.g., read or write operations) for different key-value pairs (e.g., based on instructions from the KV clients 110 and KV servers 115). In some embodiments, each time a forwarding element 100 performs a read or write operation (or other operations) for a key, the forwarding element (e.g., one of its DSPUs) updates statistics (e.g., read count, write count, other counts regarding other operations) that it maintains for the key. In some of these embodiments, the control plane 120 of the forwarding element periodically collects these statistics, or receives these statistics, from the data plane 125 circuits of the forwarding element. The controller set 505 in some embodiments collects the statistics maintained by the forwarding element 100 through control channel communications with the control plane 120.

In some embodiments, the controller set periodically or after a batch collection processes the key usage data that it receives from the KV servers 115 and the forwarding elements 100 in order to identify the overall usage data for each key. Based on this analysis, the controller set pushes the most commonly used keys (i.e., the "hottest" keys) and their associated values to forwarding elements 100. In some embodiments, all the forwarding elements store the same set of key-value pairs, while in other embodiments, different forwarding elements store different sets of key-value pairs. Also, the controller set 505 in some embodiments pushes some of the keys to spine forwarding elements in a datacenter (e.g., pushes the most commonly used keys to all spine switches), while pushing other keys to the leaf forwarding elements in the datacenter (e.g., pushes hot keys stored by a particular KV server to the leaf switch connected to that server).

Figure 6:
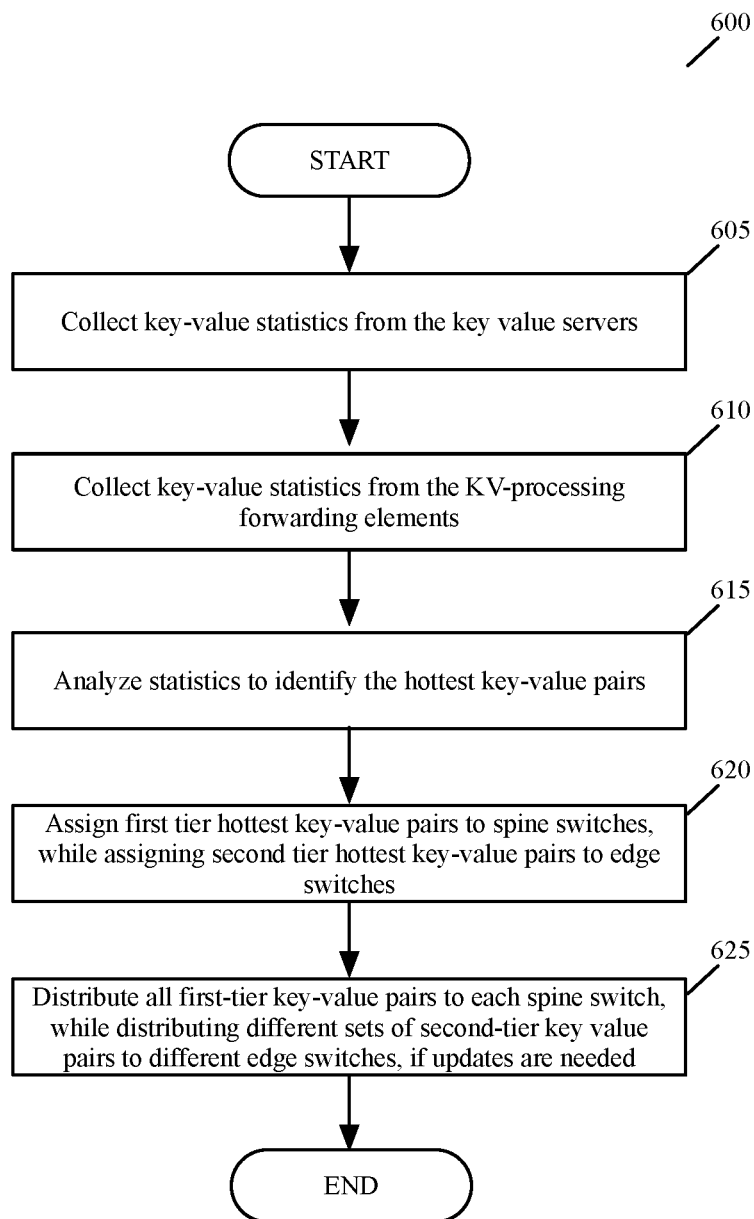
FIG. 6 illustrates a process that a controller performs to distribute key-value pairs to forwarding elements.

FIG. 6 illustrates a process 600 that a set of controllers performs in some embodiments to collect key-value usage statistics from KV servers and KV-processing forwarding elements, analyze the collected statistics, and based on this analysis, distribute key-value pairs to the KV-processing forwarding elements. Some embodiments just use one controller to perform these operations. Other embodiments use multiple such controllers to perform these operations. In some of these embodiments, one controller performs the process 600 but uses the other controllers to distribute the key-value pairs (e.g., use the different controllers that are masters of different KV-processing forwarding elements to forward they key-value pairs to their forwarding elements). In other embodiments, multiple controllers are used to perform some or all of these operations of the process 600. For instance, in some embodiments, different controllers are masters of different segments of key-value pairs, and perform the process 600 for their respective key-value segments.

Figure 7:
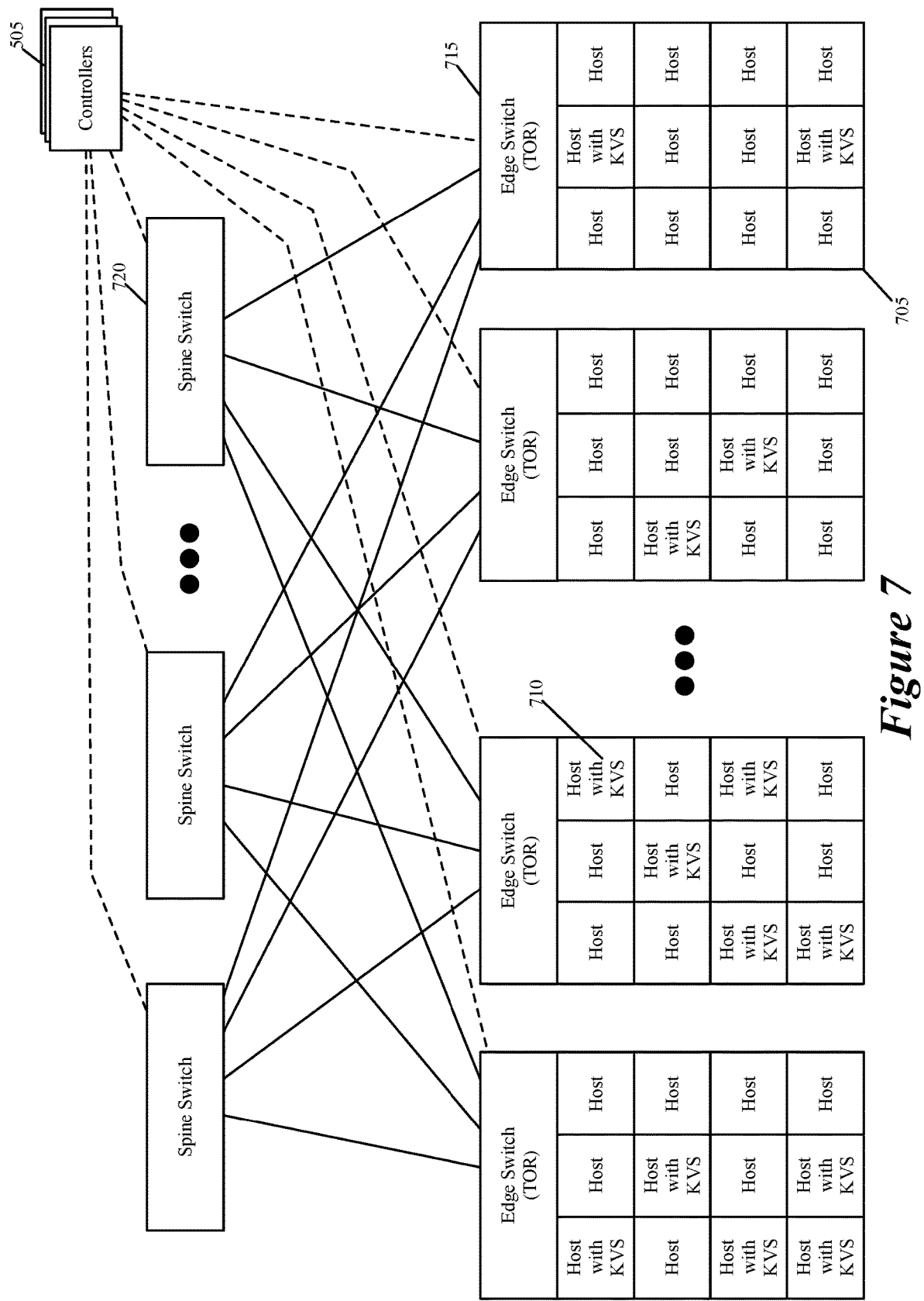
FIG. 7 illustrates a spine-edge forwarding element architecture that receives key-value pairs from a set of controllers in some embodiments.

The process 600 will be described below by reference to the spine-edge switch example illustrated in FIG. 7. This example illustrates several racks 705 of host computers 710, some of which execute one or more key-value servers (e.g., as virtual machines (VMs) or containers) and one or more key-value clients (e.g., as VMs or containers). Each rack has at least one top-of-rack (TOR) switch 715. The TOR switch 715 is an edge physical switch as it is the last physical switch connected to the host computers. The TOR switches connect to the spine physical switches 720 through a mesh architecture. In this mesh architecture, the TOR switches 715 indirectly connect to each other through the spine switches 720. Specifically, each TOR switch connects to each spine switch 720, and the spine switches provide multiple different paths between any pair of TOR switches.

A spine switch 720 typically has more computational and forwarding resources than a TOR switch 715 as it has to handle the load from multiple TOR switches. A spine switch can also connect to the TOR switches to other forwarding elements and appliances (e.g., routers, middleboxes, etc.) in this architecture, while in other embodiments, the TOR switches connect to these other forwarding elements and/or appliances directly. In some embodiments, the racks 705, the TOR switches 715 and the spine switches 720 are in one datacenter at one physical location, while in other embodiments these components are spread across two or more datacenters at two or more physical locations.

In some embodiments, the set of controllers performs the process 600 periodically to collect and analyze statistics from the KV servers and forwarding elements. In other embodiments, the controller set performs this process whenever it receives an updated set of statistics from one or more key-value servers (KVS) or one or more KV-processing forwarding elements. As shown in FIG. 6, the process 600 collects (at 605) key-value statistics from the key-value servers. In FIG. 7, the key-value servers are shown to be servers (e.g., VMs or containers) that execute on host computers 710, while the controller set is the controller cluster 505. Like the KV servers, some or all of the KV clients in some embodiments execute on the host computers 710.

The KV servers in some embodiments maintain statistics regarding key-value pairs that they have had to access to process KV requests from KV clients. Examples of such statistics include (1) the number of times that a key-value pair has been accessed for KV request processing during a particular period of time, (2) the frequency with which a key-value pair is accessed, (3) the highest frequency at which a key-value pair is accessed during a peak period with a minimum duration, etc. The KV servers in these embodiments provide some or all of these statistics to the process 600 at 605.

At 610, the process collects key-value statistics from the KV-processing forwarding elements. In FIG. 7, these KV-processing forwarding elements include the edge forwarding elements 715 and spine forwarding elements 720. The KV-processing forwarding elements 715 and 720 in some embodiments maintain statistics regarding key-value pairs that they have had to access to process KV requests from KV clients. In some embodiments, the KV-processing forwarding elements 715 and 720 collect the same statistics (e.g., number of accesses, frequency of access, highest-frequency of access, etc.) as those described above for the KV servers. One or more KV-processing forwarding elements provide some or all of these statistics to the process 600 at 610.

In some embodiments, the process 600 collects the key-value pairs along with the statistics that it collects at 605 and 610, so that the process can provide both the hottest keys and their values to the KV-processing forwarding elements when it distributes a subset of the keys (i.e., the hottest keys) to these forwarding elements. In other embodiments, the process only collects the identity of the keys (and not their values) when it collects (at 605 and 610) KV usage statistics from the KV servers and forwarding elements as it leaves it to the KV servers to provide the values of the keys to the forwarding elements. In still other embodiments, the process 600 collects (at 605 and 610) with the statistics, only some of the hottest keys or key-value pairs as the vast majority of the key-value pairs are not used enough to consider them for storing in the KV-processing forwarding elements.

At 615, the process 600 analyzes the statistics it collected from the key-value servers and forwarding elements in order to identify the key-values pairs that are most often requested (i.e., the key-value pairs that pertain to the key-value requests that the key-value servers 710 and forwarding elements 715 and 720 process). The key-value pairs that are most often processed in processing KV requests are referred to above and below as the hottest key-value pairs. In some embodiments, the process 600 produces (at 615) a sorted list of M hottest key-value pairs, where M is an integer.

At 620, the process 600 divides the hottest M key-value pairs into two tiers. The first tier includes the top N key-value pairs in the list of M hottest key-value pairs. The N key-value pairs are the key value pairs that are most often processed in the list of M hottest key-value pairs. The N key-value pairs of the first tier are for distribution to the spine switches 720, as further described below. The second tier includes the top M-N key-value pairs in the list of M hottest key-value pairs that are after the N key-value pairs in this list. The key-value pairs in the second tier are the hottest key value pairs after the hottest N key-value pairs of the first tier. The M-N key-value pairs of the second tier are for distribution to the edge TOR switches 715, as further described below.

At 625, the process 600 distributes the first tier N key-value pairs to each of the spine switches 720 if the process determines that the first tier N key-value pairs has changed since it last distributed the first tier key-value pairs to the spine switches. Each spine switch gets all of the first tier key-value pairs because these key-value pairs are deemed to be so hot (i.e., to be used so often) that it make sense to place them in the spine switches so that they can be processed sooner and more quickly by the spine switches.

For each of the remaining M-N hottest keys, the process 600 (at 625) identifies the KV server that process this second tier KV pair, and assigns the KV pair to a list of KV pairs to distribute to the edge TOR switch 715 of the identified KV server. Accordingly, at 625, the process identifies one or more KV pair lists for one or more edge TOR switches. By doing this, the process divides the second tier KV pairs into two or more lists when all of the second tier KV pairs are not processed by KV servers on one rack 705 that is serviced by one edge TOR switch 715. To each edge TOR switch for which the process identifies (at 625) a KV pair list, the process distributes (at 625) the identified KV pair list if the process determines that this list has changed since it last distributed the list of KV pairs to this edge TOR switch. In some embodiments, the lists distributed to the different TOR switches are not overlapping lists (i.e., do not have any keys in common). In other embodiments, two lists distributed to two different TOR switches can be overlapping lists (i.e., the two lists can have one or more KV pairs in common). This would be the case when different KV servers associated with the different TOR switches process the same KV pairs.

In the approach described above, each first tier hottest key-value pair is distributed to each spine switch, while each second tier hottest key-values pair is distributed to the edge TOR switch of the key-value server that stores this key-value pair. This is because each spine switch gets all of the first tier key-value pairs because these key-value pairs are deemed to be so hot (i.e., to be used so often) that it make sense to place them in the spine switches so that they can be processed sooner and more quickly by the spine switches. It is assumed that the spine switches process the hottest N key-value pairs sooner because it is assumed that the KV clients that request these KV pairs, and the KV servers that store these KV pairs, would be distributed among the different racks 705, which would mean that most of the KV requests have to traverse through the spine switches. In some embodiments, the process 600 distributes the key-value pairs to the edge and non-edge switches by directing the key-value servers to distribute these key-value pairs to these switches (e.g., by directing these servers to send the key-value write instructions in-band for the forwarding elements to capture and process).

After 625, the process 600 ends. As mentioned above, the controller set performs the process repeatedly to store the hottest key-value pairs in the KV-processing forwarding elements. These hot key-value pairs are also stored in the KV servers. However, by storing them in the KV-processing forwarding elements, these elements can process KV some or all of the KV requests that relate to these key-value pairs without sending the KV requests to the KV servers, which greatly reduces the load on these KV servers. Also, in some embodiments, the first iteration or the first few iterations of the process 600 does not push any key-value pairs to the KV-processing forwarding elements because the controller set has not yet collected sufficient statistics to identify the hottest key-value pairs appropriately.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
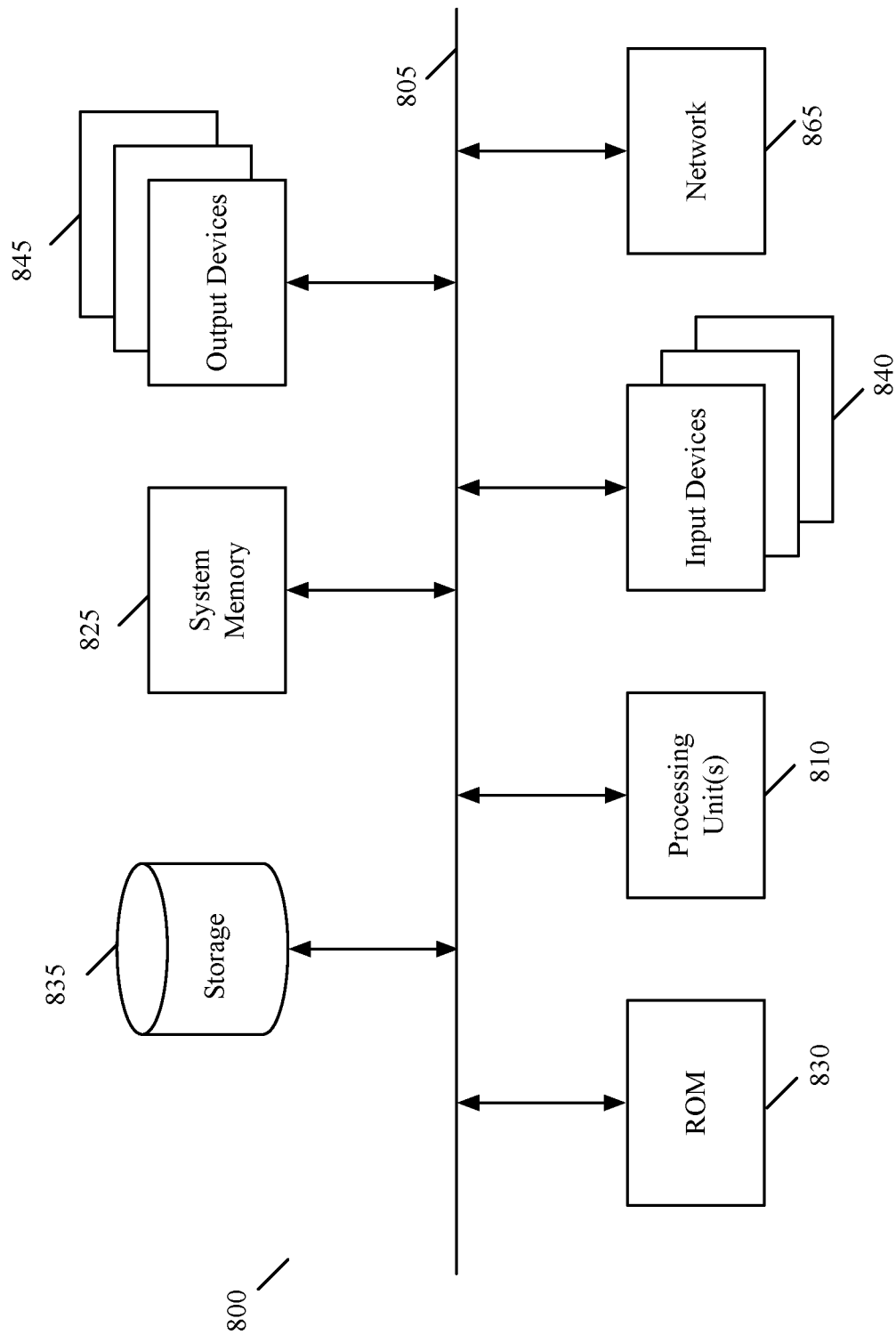
FIG. 8 conceptually illustrates a computer system with which the KV servers, KV clients or controllers of some embodiments of the invention are implemented.

FIG. 8 conceptually illustrates a computer system 800 with which the KV servers, KV clients or controllers of some embodiments of the invention are implemented. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, while some of the figures show one DSPU, one state table and one match table per each MAU stage, the forwarding elements of some embodiments have multiple match tables, multiple DPSUs, and/or multiple state tables in each MAU stage. Accordingly, one of ordinary skill in the art would understand that the invention is not to be limited by the foregoing illustrative details, but rather is to be defined by the appended claims.

The invention claimed is:

1. A data-plane forwarding circuitry configured to forward data messages received by a forwarding element to other network elements in a network, the data-plane forwarding circuitry comprising:
 a parser to access a message header from a received data message, the message header comprising a key-value instruction and a key;
 a message processing pipeline configured to process the key-value instruction;
 a memory to store a plurality of key values associated with a plurality of keys; and
 a deparser, wherein:
 when the key-value instruction is a read instruction:
  the message processing pipeline is to access a key value from the memory and modify the accessed message header to include the accessed key value,
  the data message is a first data message, and
  the deparser is to combine the modified data message header with a payload to form a second data message to forward to a network element.

2. The data-plane forwarding circuitry of claim 1, wherein the forwarding element is part of a plurality of forwarding elements that form a network fabric that communicatively connects key-value client machines with key-value server machines that execute a distributed key-value service application.

3. The data-plane forwarding circuitry of claim 1, wherein the accessed data message header comprises a layer 4 port value that specifies that the data message contains a key-value instruction.

4. The data-plane forwarding circuitry of claim 1, wherein the accessed data message header comprises a layer 4 option field that comprises the key-value instruction and the key.

5. The data-plane forwarding circuitry of claim 1, wherein the key-value instruction comprises a read instruction, a write instruction, a delete instruction or an insert instruction.

6. The data-plane forwarding circuitry of claim 1, wherein the memory is a first memory, the data-plane forwarding circuitry further comprising a match second memory to store a plurality of key records, at least one key record to store (i) a key, and (ii) a location in the first memory that stores a value associated with the key.

7. The data-plane forwarding circuitry of claim 6, wherein the match second memory is to (i) determine whether the key in the accessed data message header matches a stored key in one of the key records stored in the match second memory, and when the stored key matches the key in the accessed data message header, (ii) output the location in the first memory for the key value corresponding to matched, stored key.

8. The data-plane forwarding circuitry of claim 7, wherein when the key-value instruction is a write instruction, the first memory is to store, at the memory location output by the match second memory, a key value from the data message header.

9. The data-plane forwarding circuitry of claim 1, wherein message processing pipeline comprises a plurality of data-plane stateful processing units (DSPUs), at least two DSPUs to read or write different portions of a key value to two different memories when the key value has a size that is too large to store in a record location in one memory.

10. The data-plane forwarding circuitry of claim 9, wherein:
the message processing pipeline comprises a plurality of message processing stages to process header values associated with data messages to forward the data messages to other forwarding elements or to one or more data message destinations, and
two different DSPUs are in two different message processing stages.

11. The data-plane forwarding circuitry of claim 1, wherein when the key-value instruction is a write instruction, the data message header includes a key value, and the key value from the data message header is provided to the message processing pipeline to direct the message processing pipeline to write the key value in the memory.

12. The data-plane forwarding circuitry of claim 1, wherein the network element that is to receive the second data message comprises a key-value client machine that sent the first data message.

13. The data-plane forwarding circuitry of claim 1, wherein the network element that is to receive the second data message is different than a key-value client machine that sent the first data message.

14. The data-plane forwarding circuitry of claim 7, wherein the read instruction is accessed from the data message header and provided to the first memory along with the location output from the match second memory.

15. The data-plane forwarding circuitry of claim 7, wherein the first memory is to (i) receive the location provided by the match second memory and (ii) read the key value from the location, write a key value to the location, or invalidate the key value stored at the location.

16. The data-plane forwarding circuitry of claim 1, wherein the network elements comprise forwarding elements and machines that send and receive messages through the forwarding elements.

17. The data-plane forwarding circuitry of claim 1, wherein:
the message processing pipeline comprises a plurality of message processing stages to process header values associated with data messages to forward the data messages to other forwarding elements or to one or more data message destinations; and
at least one of the message processing stages comprises a data-plane stateful processing unit (DSPU).

* * * * *